Aug. 31, 1965 G. S. SUTHERLAND 3,203,172
METHOD OF PROPULSION UTILIZING HYBRID REACTION
ENGINE WITH POROUS FUEL GRAIN
Filed June 27, 1962 3 Sheets-Sheet 1

INVENTOR.
GEORGE S. SUTHERLAND
BY Matthis and Graybeal
ATTORNEYS

Aug. 31, 1965

G. S. SUTHERLAND 3,203,172

METHOD OF PROPULSION UTILIZING HYBRID REACTION
ENGINE WITH POROUS FUEL GRAIN

Filed June 27, 1962

INVENTOR.
GEORGE S. SUTHERLAND
BY
Mattus and Graybeal
ATTORNEYS

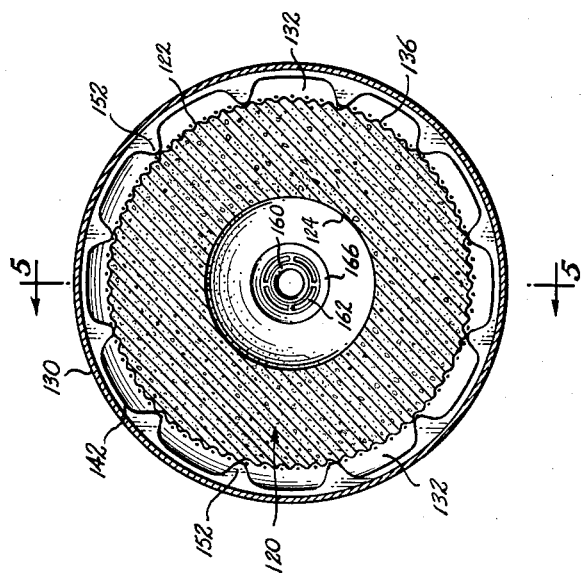
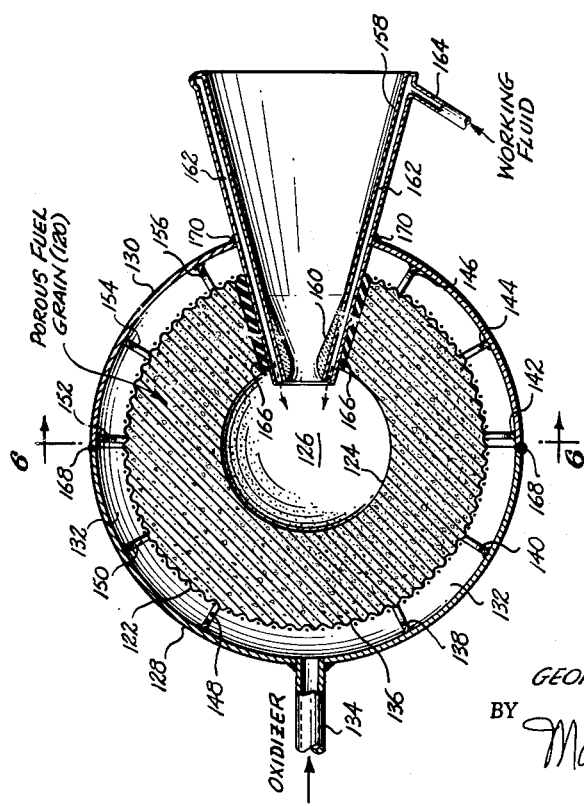

United States Patent Office
3,203,172
Patented Aug. 31, 1965

3,203,172
METHOD OF PROPULSION UTILIZING HYBRID REACTION ENGINE WITH POROUS FUEL GRAIN
George S. Sutherland, Seattle, Wash., assignor to Rocket Research Corp., Seattle, Wash., a corporation of Washington
Filed June 27, 1962, Ser. No. 205,688
12 Claims. (Cl. 60—35.4)

The present invention relates to reaction engines of the so-called hybrid type, involving a propulsion reaction between a solid fuel and a fluid oxidizer. More particularly, the invention involves an improved propulsion reaction method and arrangement wherein the fuel is available to the reaction in the form of a porous metal grain through the pores of which the fluid oxidant flows, with the reaction chamber formed in part by a surface of the porous fuel grain, and with the inflow of oxidizer and the outflow of combustion products occurring unidirectionally in the reaction chamber.

In certain preferred forms of the invention, as disclosed herein, the propulsion reaction engine in which the porous fuel grain is situated further comprises means for admixing with the oxidizer-fuel reaction product a substantially non-reacting working fluid to increase propulsion reaction preformance. Specifically, for example, the present invention is applicable to various fuel-oxidizer-working fluid propulsion systems, wherein the porous fuel grain is composed essentially of boron, beryllium, aluminum, or mixtures thereof; wherein the fluid oxidizer is oxygen, hydrogen peroxide, nitrogen dioxide, nitric acid, or mixtures thereof; and wherein the working fluid is hydrogen, hydrazine, amonia, water, or mixtures thereof. By way of cross reference, a beryllium-oxygen-hydrogen ultrahigh energy propulsion system is disclosed and claimed in Robert M. Bridgforth, Jr., U.S. Pat. No. 3,112,609, entitled Triplex Propulsion System and Method Having Thermal Radiation Suppression Aspects.

To illustrate the wide applicability of the instant invention to various porous fuel grain configurations, various aspects of the invention here disclosed as illustrated in conjunction with reaction engines having the following fuel grain configurations: with a hollow bore, cylindrical combustion surface; with a planar combustion surface; and with a hollow bore, spherical combustion surface. The fuel grain preferably but not necessarily has a substantially uniform thickness between an oxidizer ingress surface and an oxidizer egress surface.

The reaction engine arrangements here disclosed are further characterized by having spaced supporting means such as annular rings or the like configured to enable oxidized delivery to substantially the entire exterior surface (in two forms) or end surface (in one form) of the fuel grain, thus providing distributed oxidizer ingress into the grain body and substantially uniform oxidizer flow throughout the grain body. In addition, relatively incombustible reinforcement of the fuel grain, as by an embedded mesh or the like, is provided continuously of the oxidizer ingress surface of the grain to increase grain strength and improve terminal burning characteristics during the vestigial phase of the reaction. Also, certain forms of the invention as disclosed involve the incorporation of an elastomeric layer or impregnated coating preventing oxidizer outflow in the fuel grain areas contiguous to non-consumed engine parts, such as in the grain areas adjacent to the working fluid injection nozzle (FIGS. 1 and 2), adjacent to the chamber casing (FIGS. 3 and 4), and adjacent to the exhaust nozzle (FIGS. 5 and 6.)

The various objects, features and advantages of the present invention includes the following:

(1) Improved fued-oxidizer combustion, in that the egress flow of oxidizer at the fuel grain combustion surface provides unidirectional flow of oxidizer and combustion products in the reaction chamber, with intimate contact and efficient mixing of the fluid oxidizer and fuel particles, and with good oxidizer and flame diffusion aruond each fuel particle, obviating the common problem of combustion efficiency degration due to unreacted fuel particles escaping from the chamber;

(2) Readily determinable and pre-testable fuel grain properties, from the point of view of desired grain weight and porosity, to produce specified performance characteristics;

(3) Mechanical complexity of transporting and introducing fuel in solid state to a combustion reaction chamber is eliminated;

(4) Readily controllable performance, in that the fluid oxidizer (and also the working fluid, when used) can be controlled as to rate of flow during flight;

(5) Pure or substantially pure metallic fuel can be employed in the sintered fuel grain, and the inevitable performance loss associated with a hydrocarbon binder is essentially eliminated; this is particularly important where an ultrahigh performance propulsion reaction is involved such as the Be—$O_2$—$H_2$ system, wherein any dilution of the reactants results in loss of performance because the BeO reaction product has a much higher specific heat of formation than is obtained with combustion of hydrocarbons;

(6) An uncooled reaction chamber can be employed, since the flow of fluid oxidant is of itself adequate for cooling purposes;

(7) A porous fuel grain, with self-cooling oxidizer flowthrough, provides for relatively low heat conduction into the body of the grain, and enables a more stable combustion wave at the grain surface;

(8) A porous fuel grain fabricated by sintering techniques, particularly where the fuel particles are sintered in the presence of a blowing agent or foaming agent, is characterized by more efficient fuel-oxidizer mixing and lower heat conductivity in that the sintered grain inherently has several degrees of porosity and relatively more particulateness than grain bodies made porous by means other than sintering;

(9) In contrast to practice in connection with fabrication of a reaction engine with a conventional solid propellant grain, the sintered fuel grain characteristic of the present invention is sufficiently non-combustible under fabrication conditions so that the engine external casing or shell can be welded and heat treated after the sintered fuel grain is in place;

(10) Relative ease in fabrication also pertains to formation of the sintered grain per se, wherein the reinforcing mesh placed contiguous to the ingress surface thereof can be embedded in the powdered metal prior to sintering, i.e., when the green grain is formed; and

(11) The green grain in some cases can be sintered at the same time as the engine casing is heat treated.

These and other objects, features, advantages and characteristics of the present invention will be apparent from the following specific description of various typical embodiments thereof, taken together with the accompanying drawings, wherein like numerals refer to like parts, and wherein:

FIG. 5 is a somewhat schematic view of a further modified form of reaction engine characteristic of the invention, being taken along line 5—5 of FIG. 6, wherein the engine comprises a sintered fuel grain of generally spherical configuration; and FIG. 6 is a view in lateral cross section of the engine illustrated in FIG. 5, taken substantially along line 6—6 thereof.

Figure 1:
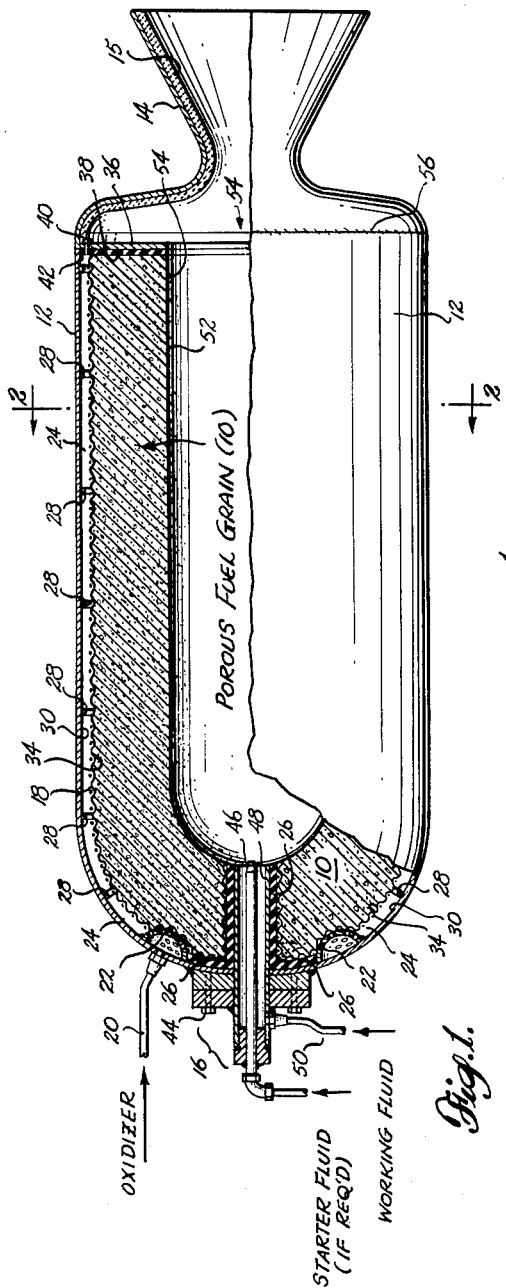
FIG. 1 is a somewhat schematic view in longitudinal elevation and cross section, taken substantially along lines 1—1 of FIG. 2, of a hybrid reaction engine including a sintered fuel grain of generally cylindrical, hollow bore configuration.
Figure 2:
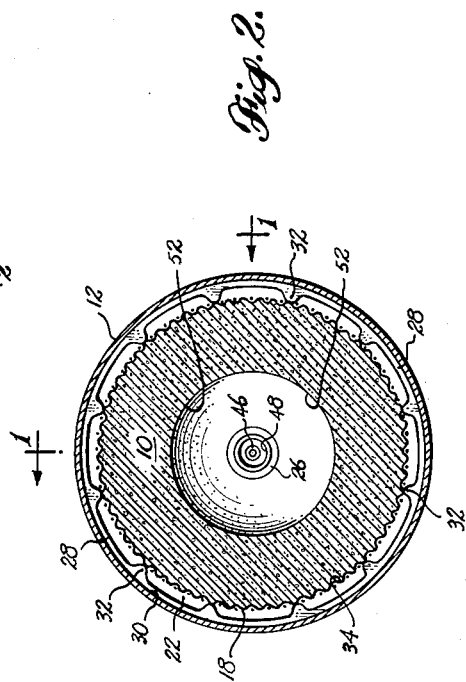
FIG. 2 is a view in lateral cross section of the engine shown in FIG. 1, taken substantially along line 2—2 thereof.

The reaction engine shown at FIGS. 1 and 2 comprises a porous fuel grain 10 of generally cylindrical, hollow bore configuration, housed in a casing 12 which terminates rearwardly in an exhaust nozzle 14, coated internally with a refractory lining 15. The casing 12 is closed forwardly by an injector assembly, generally indicated at 16.

In the manner characteristic of the invention, fluid oxidizer is fed to the exterior surface 18 of fuel grain 10 from a suitable source, not shown, through supply line 20, thence through an annular, foraminous distribution manifold 22 into the interspace 24 between grain 10 and casing 12. In terms of its relation to the oxidizer flow in the grain 10, the exterior surface 18 thereof is also termable the oxidizer ingress surface. Interspace 24 extends substantially the full length of fuel grain 10 and provides what may be termed an oxidizer distribution means defined by the interior surface of casing 12 and the exterior surface 18 of fuel grain 10. A heat shield 26 is disposed between the internal portion of injector assembly 16 and the fuel grain 10.

Structurally, fuel grain 10 is positioned in casing 12 by abutment with manifold 22 and a series of spaced grain supporting means provided by laterally extending spacer and support rings 28, mounted as by weldments to the internal surface 30 of casing 12, with each such ring 28 having a series of spaced, inwardly directed nubs or projections 32 (note FIG. 2) which physically engage and structurally support the fuel grain 10. The relatively narrow portions of the rings 28 between the projections 32 are substantially separated from the ingress surface 18 of grain 10 to permit unobstructed flow of oxidizer throughout the interspace 24.

In order to minimize vestigial crumbling during the terminal phase of combustion, a relatively non-combustible reinforcing means such mesh screen 34 or the like is contiguously integrated with the oxidizer ingress surface 24, such as by being embedded in and sintered together with the fuel grain 10.

To complete the structural mounting of fuel grain 10 in casing 22, an annular retaining ring 36 engages a sealant layer 38 on the rearward face of fuel grain 10 and is attached as by screws 40 to an annular mounting ring 42, which is in turn affixed as by weldments to the inner surface 30 of casing 12.

In the form of engine shown in FIGS. 1 and 2, injector assembly 16 mounted at the forward end of casing 12, as by bolts 44, and comprises a starter fluid injector nozzle 46 (if required), and an injector tube 48 for delivery to the reaction chamber of an essentially non-reactant working fluid supplied to inlet line 50 from a suitable source, not shown.

As will be apparent, in an engine involving simply the reaction of a fluid oxidizer with a solid fuel in the form of a porous fuel grain, without working fluid or starter fluid injection, the fuel grain configuration shown in FIGS. 1 and 2 can be simply fully closed, i.e., hemispherical at the forward end, with the oxidizer distribution interspace 24 also spanning the forward exterior of the fuel grain.

Fuel-oxidizer combustion principally occurs substantially at the oxidizer outflow or egress surface 52 of the grain 10, with combustion being completed in the reaction chamber 54. The oxidizer egress at surface 52 provides intimate contact and efficient mixing of the oxidizer and fuel particles, with what may be termed unidirectional flowthrough of oxidizer and combustion products, in contrast to the usual type of hybrid engine where the oxidizer is simply sprayed onto the fuel surface, requiring counterflow of oxidizer and combustion products. The poor combustion efficiency of the latter type of engine has seriously hampered the development of practical hybrid engines in the past. A further very important and somewhat related advantage arising from the unidirectional flowthrough of oxidizer and combustion products according to the invention is that the inflow of oxidizer tends to keep the unexposed body of the fuel grain relatively cool, maintaining a sharp temperature gradient right at the egress surface, and providing a more stable combustion wave.

To illustrate the ease of fabrication and assembly of the reaction engine shown at FIGS. 1 and 2, one manner of assembly thereof comprise first fabricating the casing 12 with the casing manifold 22, support rings 28 and mounting ring 42 installed internally thereof. Then, a preformed and presintered fuel grain 10 with its embedded mesh 34 has applied thereto shield layers 26 and 38 along with retaining ring 36. The resulting grain assembly is then inserted into the casing 12 and anchored into position by placement of bolts 40. With the fuel grain 10 thus installed in retained position, the exhaust nozzle 14 is then attached to the casing 12, as by weldment 56.

An alternative manner of fabrication can involve integrating elastomeric shield 26 with the removable injector assembly 16, and omitting sealant layer 38. In this variation, a green (unsintered) fuel grain 10 is mounted in the casing 12, with components 22, 28 and 24 having been preinstalled in the casing 12 and mesh 34 having been pressed into the surface 18 of the green grain at the time of press forming thereof. Then, with exhaust nozzle 14 installed, the casing, grain and nozzle assemblage can be subjected to heat as in a heat treatment furnace to harden the casing and nozzle, and to sinter the fuel grain. The integrated shield 26 and injector assembly 16 can then be installed at any time prior to use of the engine, such as when the oxidizer working fluid and starter fluid supply lines are connected at the point of use. This latter fabrication technique, involving simultaneously heat treating the casing and sintering the fuel grain, is also especially advantageous for the type of engine having no working fluid injection components, in which case the entire injector assembly 16 is omitted.

As will be understood, the fabrication of green fuel grains, and the sintering thereof, can be accomplished by known powder metallurgy techniques, with selective control of grain porosity to meet assigned performance specifications.

For example, the porous metal fuel grain may be formed by several means; a preferential method consists of the following:

(1) Prepare powdered fuel with a particle size on the order of 1–10 microns.

(2) Prepare a slurry composed of the metal fuel powder and a liquid plastic binder.

(3) Add a blowing agent to the slurry and place in a prepared mold.

(4) Heat mixture to decompose blowing agent, thereby forming interconnected gas-filled voids, and to solidify plastic binder, the resulting grain being the so-called "green" grain.

(5) Place the green grain in an oven at appropriate sintering temperature for the metal fuel powder, thereby driving off all organic components and forming attachments between all adjacent metal particles to obtain a structurally sound grain.

An alternate method for forming the grain, depending on the extent of porosity required for proper oxidizer flowthrough, simply involves compressing the grain to the desired shape under relatively low compacting pressure and sintering directly.

A third method, which has the disadvantage of yielding a structure with solid metal pore walls, utilizes molten metal fuel which is injected into a mold packed with a water-soluble salt. After hardening, the salt is leached from the metal structure, leaving many interconnected voids.

In general, the sintered fuel grain is to have only sufficient porosity so that stoichiometric mixing and fuel-oxidizer combustion principally occurs just as the fuel particles are separating from and being carried away from the oxidizer egress surface of the fuel grain. For a given pressurization of oxidizer at the ingress surface of the grain, insufficient grain porosity tends to result in inefficient, fuel rich combustion. On the other hand, excessive porosity of the fuel grain tends to result in inefficient, fuel rich combustion. One the other hand, excessive porosity of the fuel grain tends to result in inefficient, oxidizer rich combustion in that much of the fluid oxidizer is exhausted from the reaction chamber without being combusted. Desirably, the porosity and oxidizer feed pressure are to be selected so that substantially stoichiometric combustion occurs at the egress surface in a manner quite analogous to the manner of combustion of a composite solid propellant. The sintered grain is to have sufficient porosity so that with self-cooling the thermal conductivity is reduced to the point where a quite steep temperature gradient exists at the egress surface. Under these conditions a stable flame is maintained at the surface and the heat feedback from the flame is just sufficient to melt and vaporize the exposed metallic fuel particles. In practice the character of the combustion zone is rather heterogeneous, and is composed of many small diffusion flamelets, created by adjacent pockets of oxidizer gas and metallic fuel vapor.

As earlier indicated, it is an important advantage of use of a porous fuel grain in the manner here disclosed that the operational characteristics of a given fuel grain can be determined prior to actual operation of the engine. To illustrate, a given porous fuel grain can be pretested to reveal its particular oxidizer flow rate at a given oxidizer supply pressure, and individual performance of the engine can be programmed to conform to stated performance requirements by suitable regulation of oxidizer supply pressure. As will also be apparent, change in performance characteristics, even while an engine is in operation, is accomplishable simply by change in oxidizer supply rate and/or working fluid supply rate. For example, when the propulsion performance level be as uniform as possible throughout the period of engine operation, it can be desirable to progressively reduce oxidizer supply pressure slightly during the progress of the combustion reaction, in order to compensate for the progressive thinning of the fuel grain.

Figure 3:
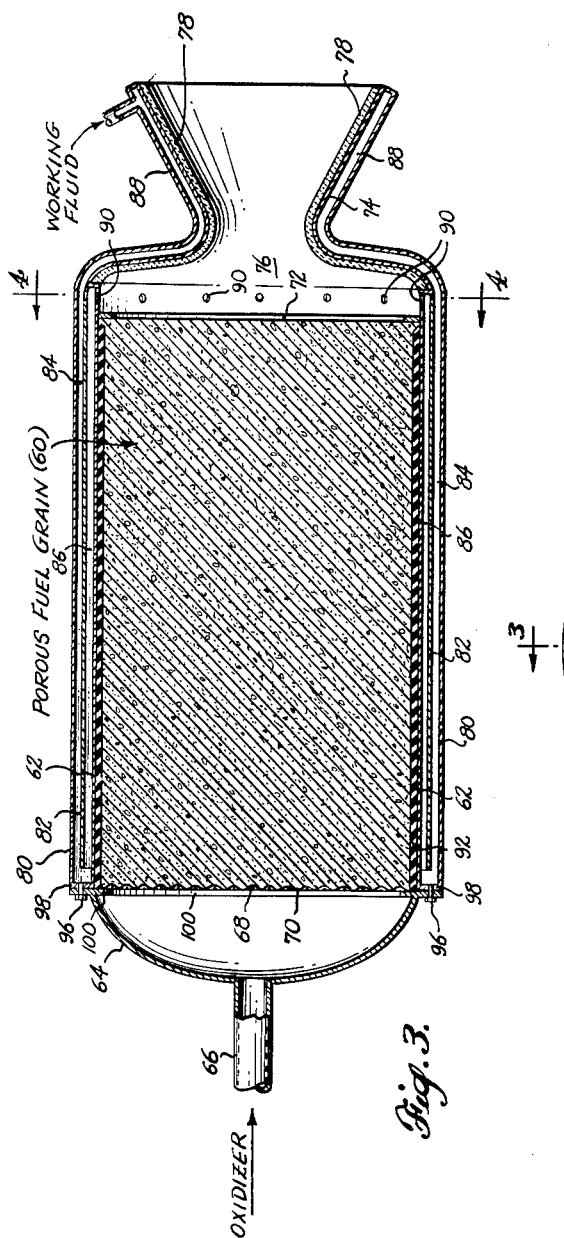
FIG. 3 is a somewhat schematic view in longitudinal cross section, taken substantially along line 3—3 of FIG. 4, showing a modified form of reaction engine characteristic of the invention, wherein the engine comprises a sintered fuel grain in the general configuration of a solid cylinder.
Figure 4:
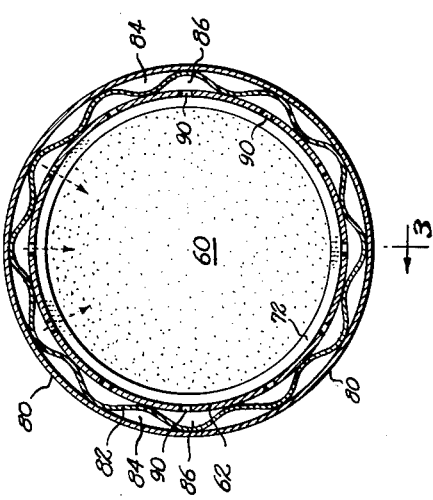
FIG. 4 is a view in lateral cross section of the engine illustrated at FIG. 3, taken substantially along line 3—3 thereof.

FIGS. 3 and 4 illustrate a modified form of reaction engine characteristic of the invention, utilizing a porous fuel grain which is geometrically a solid cylinder. As will be evident, this grain configuration is operationally similar to the conventional form of composite solid propellant grain, with progressive burning of the grain axially, but in contrast to a composite propellant grain is controllable as to rate of combustion in that the associated fluid oxidizer and/or working fluid are operationally controllable.

This form of engine, as shown in FIGS. 3 and 4, comprises porous fuel grain 60 housed within a cylindrical casing 62 which is capped at its forward end by oxidizer manifold 64, fed fluid oxidizer from a suitable source, not shown, through inlet line 66. A reinforcing mesh 68 is embedded in oxidizer ingress surface 70 of the porous fuel grain 60, and egress surface 72 thereof faces the exhaust nozzle 74, providing a reaction zone or chamber 76. Exhaust nozzle 74 is optionally internally coated with a refractory lining 78, as shown.

In order to cool the casing 62 and nozzle 74, as well as to provide regenerative heating of the working fluid injected into reaction chamber 76, the reaction engine shown in FIGS. 3 and 4 incorporates an external cylindrical shell 80 concentric with and spaced from casing 62, and a corrugated channeling member 82 (note FIG. 4) forming an alternating series of working fluid channnels or passageways 84, 86. In sequence of flow, the working fluid is first channeled through manifold 88 exteriorly of nozzle 74 and in heat exchange relationship therewith, thence through passageways 84 between shell 80 and member 82, thence through passageways 86 between member 82 and casing 62, and finally into the reaction chamber 76 by way of the circumferentially arranged series of openings or nozzles 90. As will be understood the channelling for providing heat exchange between the nozzle and casing on the one hand and the working fluid on the other hand can be any other structural arrangement desired. By way of further example, the whole casing and channel arrangment can simply be a series of axially extending tubes, in a manner known per se, rather than as shown in FIG. 4.

Casing 62 is also protected from being overheated by a elastomeric or refractory shielding coating or layer 92, as desired.

An anchor ring 94 is attached as by being welded to the casing 62 in the area thereof just forward of nozzles 90, and the grain 60 is inserted into the casing 62 from the forward end in assembling the engine. Oxidizer manifold 64 is then placed in the manner shown in FIG. 3 and attached as by bolts 96, or by a weldment, to the lateral wall 98 at the forward end of casing 62. Ring-like projection 100 abuts the peripheral edge of ingress surface 70 of grain 60 and, along with ring 94, anchors the grain in place. A suitable ignition device, known per se and not shown, can be positioned at egress surface 72 of the grain 60 to initiate reaction.

As will be seen with respect to the engine illustrated at FIGS. 3 and 4, oxidizer flowing through the pores of the grain emerges at the egress surface 72 and mixes and burns with the fuel substantially at such surface, with self-cooling and unidirectional flowthrough in like manner as accomplished in the earlier discussed form of the invention illustrated at FIGS. 1 and 2.

FIGS. 5 and 6 present a further modification of porous fuel grain type reaction engine according to the present invention, wherein the grain form provides a generally spherical reaction zone, with an inset exhaust nozzle. In this engine, porous fuel grain 120 is formed with an external oxidizer ingress surface 122 and an internal oxidizer egress surface 124 defining a reaction chamber generally indicated at 126.

Two-part casing 128, 130 surrounds fuel grain 120, with an interspace 132 provided therebetween for distribution of fluid oxidizer to the entire ingress surface 122, oxidizer being supplied from a suitable source, not shown, through inlet line 134. Embedded in the ingress surface 122 of the grain 120 is reinforcing mesh 136. Structural support for the grain 120 within the casing 128, 130 is provided by a series of support rings 138, 140, 142, 144, 146, each having respective spaced projections or nubs 148, 150, 152, 154, 156 physically engaging the ingress surface 122 of the grain 120. Said rings 138–146 are each annular in configuration, attached as by weldments to the inner surface of casing 128, 130, and arranged concentrically of the engine axis.

Inset into grain 120 is a nozzle assembly comprising exhaust nozzle 158 having an internal refractory lining 160 at the throat, and a cross-sectionally annular working fluid inlet passageway 162 receiving working fluid from a suitable source, not shown, by way of inlet line 164, and regeneratively heating the working fluid prior to injection thereof into the reaction zone 126. Elastomeric heat shield 166 is provided between the throat portion of the nozzle assembly and the adjacent portions of the grain 120, as shown.

To illustrate a typical manner of assembly of the type of engine illustrated at FIGS. 5 and 6, the casing components 128, 130 are first fabricated with support rings 138, 140, 142, 144, 146 in place. The presintered grain 120 is then positioned in casing part 128, and casing part 130 is then emplaced and joined to casing part 128, as by weldment 168. Elastomeric coating 166 is then applied to grain 120, and the exhaust nozzle assembly 158–164 is installed, being bonded to the grain 120 when the elastomeric coating 166 cures, and being joined with the casing part 130, as by weldment 170.

From the foregoing, various other modifications, arrangements, and grain fabrication techniques will occur to those skilled in the arts to which the invention is addressed, within the scope of the following claims.

What is claimed is:

1. The method of generating propulsion by combustion of a porous fuel grain and a fluid oxidizer in the reaction chamber of a propulsion reaction engine, said method comprising: delivering the oxidizer into the reaction chamber through the pores of the porous fuel grain; and combusting the fuel and oxidizer as the oxidizer emerges into the reaction chamber.

2. The method of claim 1, wherein the porous fuel grain is composed of particulated sintered metal.

3. The method of claim 2, wherein the sintered fuel grain is characterized by several degrees of porosity.

4. The method of claim 1, wherein said fuel grain is particulated and composed essentially of a metal selected from the group consisting of boron, beryllium, aluminum, and mixtures thereof.

5. The method of claim 1, wherein said fluid oxidizer is selected from the group consisting of oxygen, hydrogen peroxide, nitrogen dioxide, nitric acid, and mixtures thereof.

6. The method of generating propulsion by reaction of a porous fuel grain and fluid oxidizer in a reaction propulsion engine, said method comprising: flowing the oxidizer into the engine reaction chamber through the pores of the porous fuel grain; and substantially stoichiometrically combusting the oxidizer and fuel at oxidizer egress surface of the grain, with the inflow of oxidizer and the outflow of combustion products occuring substantially unidirectionally in the reaction chamber.

7. The method of generating propulsion by combustion of a porous fuel grain and a fluid oxidizer in the reaction chamber of a propulsion reaction engine, said method comprising: delivering the oxidizer into the reaction chamber through the pores of the porous fuel grain; combusting the fuel and oxidizer as the oxidizer emerges into the reaction chamber; and controlling the oxidizer feed rate to control the rate of combustion.

8. The method of claim 7, further comprising progressively reducing the oxidizer feed pressure so as to maintain the rate of combustion substantially uniform as the fuel grain is consumed.

9. The method of generating propulsion by combustion of a porous fuel grain and a fluid oxidizer in the reaction chamber of a propulsion reaction engine, said method comprising: delivering the oxidizer into the reaction chamber through the pores of the porous fuel grain; combusting the fuel and oxidizer as the oxidizer emerges into the reaction chamber; and injecting a substantially non-reacting, low molecular weight working fluid into said reaction chamber to increase propulsion performance.

10. The method according to claim 9, further comprising regulating the working fluid feed pressure to regulate propulsion performance.

11. The method of claim 9, wherein said working fluid is selected from the group consisting of hydrogen, hydrazine, ammonia, water, and mixtures thereof.

12. The method of claim 9, wherein said working fluid is essentially hydrogen.

References Cited by the Examiner

UNITED STATES PATENTS

| | | | |
|---|---|---|---|
| 2,510,572 | 6/50 | Goddard | 60—35.6 |
| 2,972,227 | 2/61 | Allen | 60—35.6 |
| 3,068,641 | 12/62 | Fox | 60—35.4 |
| 3,071,924 | 1/63 | Carr | 60—35.4 |
| 3,093,960 | 6/63 | Tyson | 60—35.4 |

CARL D. QUARFORTH, *Primary Examiner.*